(12) United States Patent
Nevinsky et al.

(10) Patent No.: US 12,372,332 B2
(45) Date of Patent: Jul. 29, 2025

(54) ADDITIVELY MANUFACTURED ARMOR AND METHOD FOR MAKING THE SAME

(71) Applicant: The Boeing Company, Chicago, IL (US)

(72) Inventors: Michael D. Nevinsky, Media, PA (US); Antonio Paesano, Wilmington, DE (US); Nilay B. Pandya, Elkton, MD (US)

(73) Assignee: The Boeing Company, Arlington, VA (US)

( * ) Notice: Subject to any disclaimer, the term of this patent is extended or adjusted under 35 U.S.C. 154(b) by 475 days.

(21) Appl. No.: 17/833,619

(22) Filed: Jun. 6, 2022

(65) Prior Publication Data

US 2023/0392903 A1   Dec. 7, 2023

(51) Int. Cl.
*F41H 5/04* (2006.01)
*B32B 3/06* (2006.01)
*B33Y 10/00* (2015.01)
*B33Y 80/00* (2015.01)

(52) U.S. Cl.
CPC ............. *F41H 5/0421* (2013.01); *B32B 3/06* (2013.01); *B33Y 10/00* (2014.12); *B33Y 80/00* (2014.12); *F41H 5/0428* (2013.01); *B32B 2266/045* (2013.01)

(58) Field of Classification Search
CPC ........... B33Y 10/00; B33Y 80/00; B32B 3/06; B32B 3/30; B32B 9/041; B32B 9/005; B32B 15/04; B32B 5/18; B32B 5/22; B32B 5/32; B32B 2266/045; B32B 2266/049; B32B 2266/051; F41H 5/0421; F41H 5/0442; F41H 5/0414
USPC ......... 428/161, 164, 158, 162, 304.4, 307.3, 428/306.6, 312.8, 314.8, 315.9, 316.6
See application file for complete search history.

(56) References Cited

U.S. PATENT DOCUMENTS

| | | | |
|---|---|---|---|
| 3,243,313 A * | 3/1966 | Aves, Jr. | ................. E04B 1/942 65/59.32 |
| 9,682,536 B2 | 6/2017 | Wilenski et al. | |
| 2005/0133910 A1* | 6/2005 | Riedl | ................ H01L 21/76888 257/E23.06 |
| 2012/0174754 A1 | 7/2012 | Salisbury et al. | |
| 2017/0363393 A1 | 12/2017 | Ganor | |
| 2020/0326160 A1 | 10/2020 | Zamorano et al. | |

* cited by examiner

*Primary Examiner* — Catherine A. Simone
(74) *Attorney, Agent, or Firm* — Kunzler Bean & Adamson

(57) ABSTRACT

Disclosed herein is an additively manufactured multi-layered ballistic armor and a method of forming a multi-layered ballistic armor. The multi-layered ballistic armor includes a metal layer and a ceramic layer. The metal layer includes first mechanical interconnection features and a plurality of first pores. The ceramic layer includes second mechanical interconnection features configured to mechanically interconnect with the first mechanical interconnection features and a plurality of second pores.

20 Claims, 14 Drawing Sheets

ADDITIVELY MANUFACTURED ARMOR AND METHOD FOR MAKING THE SAME

FIELD

This disclosure relates generally to forming multi-layered ballistic armor, and more particularly to controlling crack propagations, such as caused by impacts with a projectile, and improving ballistic performance-to-weight ratio in multi-layered ballistic armor.

BACKGROUND

Current armor solutions, in many cases, are metallic and consist of a series of bolt-on flat plates, which are heavy and clunky, and do not effectively absorb or direct the impact of ballistic projectiles. Additionally, bolt-on flat plates do not effectively protect complex-shaped components. Also, current armor solutions require excessive labor during manufacture and integration into applications (e.g., vehicle, body armor), which creates additional cost.

SUMMARY

The subject matter of the present application has been developed in response to the present state of the art, and in particular, in response to the shortcomings of conventional multi-layer material manufacturing, that have not yet been fully solved by currently available techniques. Accordingly, the subject matter of the present application has been developed to provide additive manufacturing methods and ballistic armor and systems formed using additive manufacturing methods that overcome at least some of the above-discussed shortcomings of prior art techniques.

The following is a non-exhaustive list of examples, which may or may not be claimed, of the subject matter, disclosed herein.

The following portion of this paragraph delineates example 1 of the subject matter, disclosed herein. According to example 1, a ballistic armor includes a metal layer and a ceramic layer. The metal layer includes first mechanical interconnection features and a plurality of first pores. The ceramic layer includes second mechanical interconnection features configured to mechanically interconnect with the first mechanical interconnection features and a plurality of second pores.

The following portion of this paragraph delineates example 2 of the subject matter, disclosed herein. According to example 2, which encompasses example 1, above, at least some of the plurality of first pores have a different size than others of the plurality of first pores such that a density of the metal layer changes across a thickness of the metal layer without reducing resistance to ballistic impact below a first threshold amount and at least some of the plurality of second pores have a different size than others of the plurality of second pores such that a density of the ceramic layer changes across a thickness of the ceramic layer without reducing resistance to ballistic impact below a second threshold amount.

The following portion of this paragraph delineates example 3 of the subject matter, disclosed herein. According to example 3, which encompasses example 2, above, the density of the metal layer increases across the thickness of the metal layer in a direction toward the ceramic layer and the density of the ceramic layer decreases across the thickness of the ceramic layer in a direction toward the metal layer.

The following portion of this paragraph delineates example 4 of the subject matter, disclosed herein. According to example 4, which encompasses any one of examples 1-3, above, at least one of the metal layer or the ceramic layer has a density that varies in a previously defined direction configured to cause for deflection of a force of a ballistic projectile.

The following portion of this paragraph delineates example 5 of the subject matter, disclosed herein. According to example 5, which encompasses any one of examples 1-4, above, the plurality of first pores and the plurality of second pores has at least one of a quantity, sizes, shapes, and distribution patterns chosen according to a predefined criterion.

The following portion of this paragraph delineates example 6 of the subject matter, disclosed herein. According to example 6, which encompasses example 5, above, the predefined criterion is based on one of a value of ballistics resistance versus weight or a pattern configured to minimize crack propagation through at least one of the metal layer and the ceramic layer.

The following portion of this paragraph delineates example 7 of the subject matter, disclosed herein. According to example 7, which encompasses any one of examples 1-6, above, the ceramic layer further includes a plurality of ceramic panels, the metal layer further includes metal posts interposed between adjacent ceramic panels, and the first mechanical interconnection features are located on the metal posts.

The following portion of this paragraph delineates example 8 of the subject matter, disclosed herein. According to example 8, which encompasses any one of examples 1-7, above, a polymer layer is bonded to the metal layer.

The following portion of this paragraph delineates example 9 of the subject matter, disclosed herein. According to example 9, which encompasses any one of examples 1-8, above, the metal layer and the ceramic layer are shaped to conform to a part of a device, wherein the part of the device has a rounded or non-flat surface, two surfaces connected at an angle, or a combination thereof.

The following portion of this paragraph delineates example 10 of the subject matter, disclosed herein. According to example 10, a method of forming ballistic armor includes forming a metal layer having first mechanical interconnection features and a plurality of first pores and forming a ceramic layer, having a plurality of second pores and second mechanical interconnection features, onto the metal layer such that the second mechanical interconnection features interlock with the first mechanical interconnection features.

The following portion of this paragraph delineates example 11 of the subject matter, disclosed herein. According to example 11, which encompasses example 10, above, forming the ceramic layer includes additively manufacturing the ceramic layer onto the metal layer.

The following portion of this paragraph delineates example 12 of the subject matter, disclosed herein. According to example 12, which encompasses example 11, above, additively manufacturing includes forming a first sub-layer of the ceramic layer onto the metal layer and forming a second sub-layer of the ceramic layer onto the first sub-layer of the ceramic layer.

The following portion of this paragraph delineates example 13 of the subject matter, disclosed herein. According to example 13, which encompasses any one of examples 11-12, above, forming the ceramic layer further includes forming at least some of the plurality of second pores to have a different size than others of the plurality of second pores such that a density of the ceramic layer changes across a thickness of the ceramic layer and forming the metal layer further includes forming at least some of the plurality of first pores to have a different size than others of the plurality of first pores such that a density of the metal layer changes across a thickness of the metal layer.

The following portion of this paragraph delineates example 14 of the subject matter, disclosed herein. According to example 14, which encompasses any one of examples 10-13, above, forming the metal layer includes forming a plurality of metal supports and forming the first mechanical interconnection features onto the metal supports.

The following portion of this paragraph delineates example 15 of the subject matter, disclosed herein. According to example 15, which encompasses example 14, above, forming the ceramic layer further includes forming the ceramic layer into panels each having at least one of the second mechanical interconnection features and the panels are interposed between the metal supports and the first mechanical interconnection features are interconnected with the second mechanical interconnection features.

The following portion of this paragraph delineates example 16 of the subject matter, disclosed herein. According to example 16, which encompasses any one of examples 10-15, above, forming the metal layer and the ceramic layer further includes forming the metal layer and the ceramic layer to conform to a part of a device, wherein the part of the device has a rounded or non-flat surface, two surfaces connected at an angle, or a combination thereof.

The following portion of this paragraph delineates example 17 of the subject matter, disclosed herein. According to example 17, a vehicle includes a component and ballistic armor configured to ballistically protect the component. The ballistic armor includes a metal layer and a ceramic layer. The metal layer includes first mechanical interconnection features and a plurality of first pores. The ceramic layer includes second mechanical interconnection features, configured to mechanically interconnect with the first mechanical interconnection features and a plurality of second pores.

The following portion of this paragraph delineates example 18 of the subject matter, disclosed herein. According to example 18, which encompasses example 17, above, the plurality of first pores and the plurality of second pores include a quantity, size values, shape values, and distribution pattern chosen according to a value of ballistics resistance versus weight, a pattern defined to minimize crack propagation through one of the metal layer, the ceramic layer, or a combination thereof.

The following portion of this paragraph delineates example 19 of the subject matter, disclosed herein. According to example 19, which encompasses example 18, above, at least some of the plurality of first pores have a different size and distribution pattern than others of the plurality of first pores such that a density of the metal layer changes across a thickness of the metal layer and at least some of the plurality of second pores have a different size and distribution pattern than others of the plurality of second pores such that a density of the ceramic layer changes across a thickness of the ceramic layer.

The following portion of this paragraph delineates example 20 of the subject matter, disclosed herein. According to example 20, which encompasses any one of examples 18-19, above, at least one of the metal layer or the ceramic layer has a density that varies in a previously defined direction configured to cause for deflection of a force applied thereto.

The described features, structures, advantages, and/or characteristics of the subject matter of the present disclosure may be combined in any suitable manner in one or more examples and/or implementations. In the following description, numerous specific details are provided to impart a thorough understanding of examples of the subject matter of the present disclosure. One skilled in the relevant art will recognize that the subject matter of the present disclosure may be practiced without one or more of the specific features, details, components, materials, and/or methods of a particular example or implementation. In other instances, additional features and advantages may be recognized in certain examples and/or implementations that may not be present in all examples or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific examples that are illustrated in the appended drawings. Understanding that these drawings depict only typical examples of the subject matter, they are not therefore to be considered to be limiting of its scope. The subject matter will be described and explained with additional specificity and detail through the use of the drawings, in which:

FIG. 7-1 is a top view of a multi-layered ballistic part, according to one or more examples of the present disclosure;

FIG. 7-2 is a cross-sectional view of the multi-layered ballistic part of FIG. 5-1;

FIG. 10-1 is a cross-sectional view of a conformed multi-layered ballistic armor, according to one or more examples of the present disclosure;

FIG. 10-2 is a perspective view of a component of a vehicle, according to the prior art;

FIG. 10-3 is a perspective view of the component of the vehicle of FIG. 10-2 having a conformed multi-layered ballistic armor, according to one or more examples of the present disclosure;

FIG. 10-4 is a perspective view of the component of FIG. 10-2, according to one or more examples of the present disclosure;

FIG. 10-5 is a plan view of the component of FIG. 10-2, according to one or more examples of the present disclosure;

FIG. 10-6 is a plan view of the component of FIG. 10-2, according to one or more examples of the present disclosure;

FIG. 11-1 is a cross-sectional view of a tube component having a conformed multi-layered ballistic armor, according to one or more examples of the present disclosure;

FIG. 11-2 is a perspective view of a tube component having a conformed multi-layered ballistic armor, according to one or more examples of the present disclosure;

FIG. 11-3 is a perspective view of a tube component having a conformed multi-layered ballistic armor, according to one or more examples of the present disclosure;

DETAILED DESCRIPTION

Reference throughout this specification to "one example," "an example," or similar language means that a particular feature, structure, or characteristic described in connection with the example is included in at least one example of the present disclosure. Appearances of the phrases "in one example," "in an example," and similar language throughout this specification may, but do not necessarily, all refer to the same example. Similarly, the use of the term "implementation" means an implementation having a particular feature, structure, or characteristic described in connection with one or more examples of the present disclosure, however, absent an express correlation to indicate otherwise, an implementation may be associated with one or more examples.

Disclosed herein are parts having multiple layers that are mechanically interconnected together, have varying densities within the layers, and have varying materials between the layers. In some examples, the part is a ballistic armor. When the part is a ballistic armor, the multiple layers promote the absorption, deflection, and/or capture of all or portions of ballistic projectiles.

In some embodiments, each one of the multiple layers of the ballistic armor is made from one or more of ceramic material, metal material, and polymer (e.g., Kevlar®) or ultra-high molecular weight polyethylene (UHMWPE) materials (e.g., Dyneema®). The polymer layer can be made of a composite comprising a polymer matrix and a filler in form of fibers, particles, whiskers, or platelets. The filler can be made of metal, ceramic, or polymer. In one example, one of the multiple layers of the ballistic armor is made of a ceramic material and another one of the multiple layers of the ballistic armor is made of a polymer material. The combination of layers made of the ceramic material and the polymer material provides a lightweight ballistic armor, whereby the hardness of the ceramic material is used to break up a projectile and the polymer material captures remaining portions of the projectile. By means of additive manufacturing, the ballistic armor can be shaped to conform (e.g., correspond, match, complement, etc.) to any complex geometries of one or more components the ballistic armor is designed to protect. The ability to conform the shape of the ballistic armor to components enables protection, from ballistic projectiles, in limited-volume environments, while optimizing weight. Additionally, the ability to conform the shape of the ballistic armor to components with complex shapes, such as seats, windows, guns/weapons, and the like, promotes more ergonomic protection for humans.

The ballistic armor described herein can be formed using an additive manufacturing process, where a first layer of the ballistic armor is formed before a second layer of the ballistic armor is formed on the first layer. Features formed in, on, and/or extending from the two layers help to mechanically interconnect the layers without adhesives.

Figure 1:
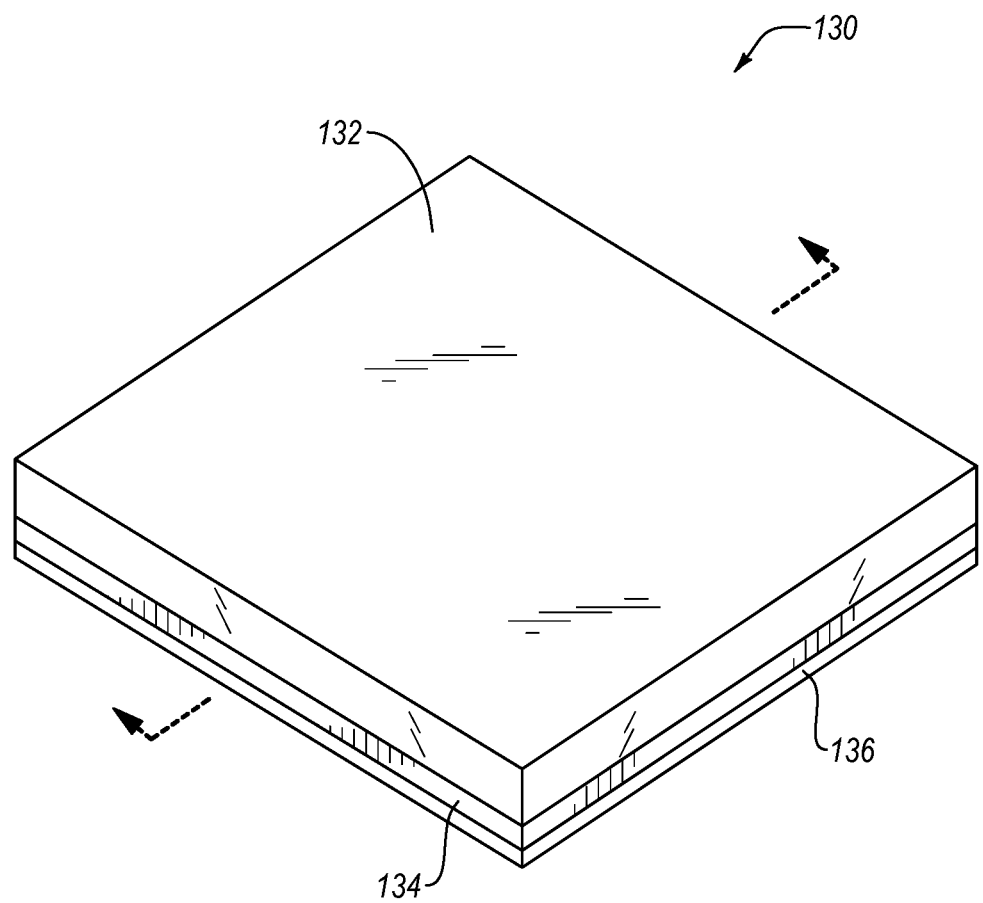
FIG. 1 is a schematic perspective view of a multi-layered ballistic armor, according to one or more examples of the present disclosure.
Figure 2:
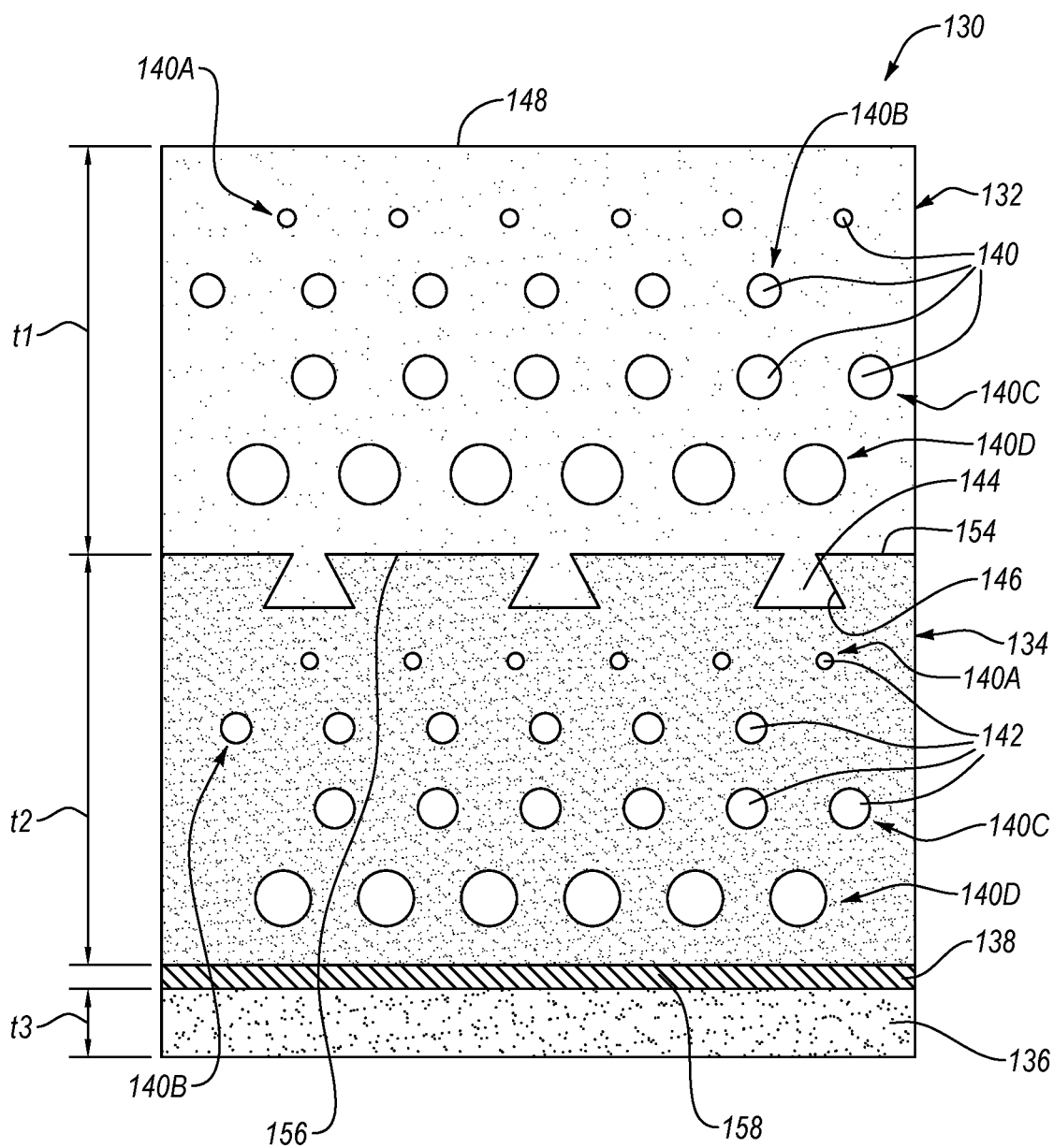
FIG. 2 is a cross-sectional view of the multi-layered ballistic part of FIG. 1.

Referring to FIGS. 1 and 2, in various embodiments, a ballistic armor 130 includes a ceramic layer 132, having a first thickness t1, a metal layer 134, having a second thickness t2, and a polymer layer 136, having a third thickness t3. The ceramic layer 132 is directly connected to the metal layer 134. The metal layer 134 is interposed between ceramic layer 132 and the polymer layer 136. In some examples, the polymer layer 136 is attached to the metal layer 134 via an adhesive layer 138, such that the adhesive layer 138 is interposed between the metal layer 134 and the polymer layer 136. In this manner, the metal layer 134 is sandwiched between the ceramic layer 132 and the adhesive layer 138. The ceramic layer 132 is an outer layer, which is configured to receive impact from projectile first.

The ceramic layer 132 can be made from aluminum nitride, zirconia, silicon nitride, silicon carbide, alumina, and other comparable materials. The metal layer 134 can be made from stainless steels (17-4 PH, 316L, 304), tool steels (H13, A2, D2), specialty alloys (Inconel®, cobalt chromium, and others), titanium (e.g., Ti64, etc.), aluminum (4047, 6061, 7075, etc.), or comparable materials. The polymer layer 136 can be made from UHMWPE materials and other polymers of suitable properties.

The metal layer 134 includes first mechanical interconnection features 146. The ceramic layer 132 includes second mechanical interconnection features 144. The first and second mechanical interconnection features 144 and 146 interconnect, respectively (e.g., interlock) with each other to help fasten the ceramic layer 132 directly to the metal layer 134 without adhesives. In some examples, the mechanical interconnection features 144 and 146 at least partially overlap each other in a direction parallel to the thicknesses t1, t2, t3 of the ceramic layer 132 and the metal layer 134. Accordingly, each one of the mechanical interconnection features 146 includes at least one overhang portion. Another way to describe the overhang/overlapping features is to say that each one has at least one negative rake angle. In one example, as shown in FIG. 2, the mechanical interconnection features 146 include cavities or troughs within a ballistics-proximal surface 156 of the metal layer 134. The cavities or troughs has sides that pinch in to form a cavity with an opening at the ballistics-proximal surface 156 of the metal layer 134 that has a smaller dimension than the corresponding cavity or trough. The mechanical interconnection features 144 of the ceramic layer 132 have a reverse configuration of the mechanical interconnection features 146 of the metal layer 134 due to the ceramic layer 132 and the mechanical interconnection features 144 formed/layered/printed within the cavities or troughs of the previously formed mechanical interconnection features 146 of the metal layer 134.

Figure 6:
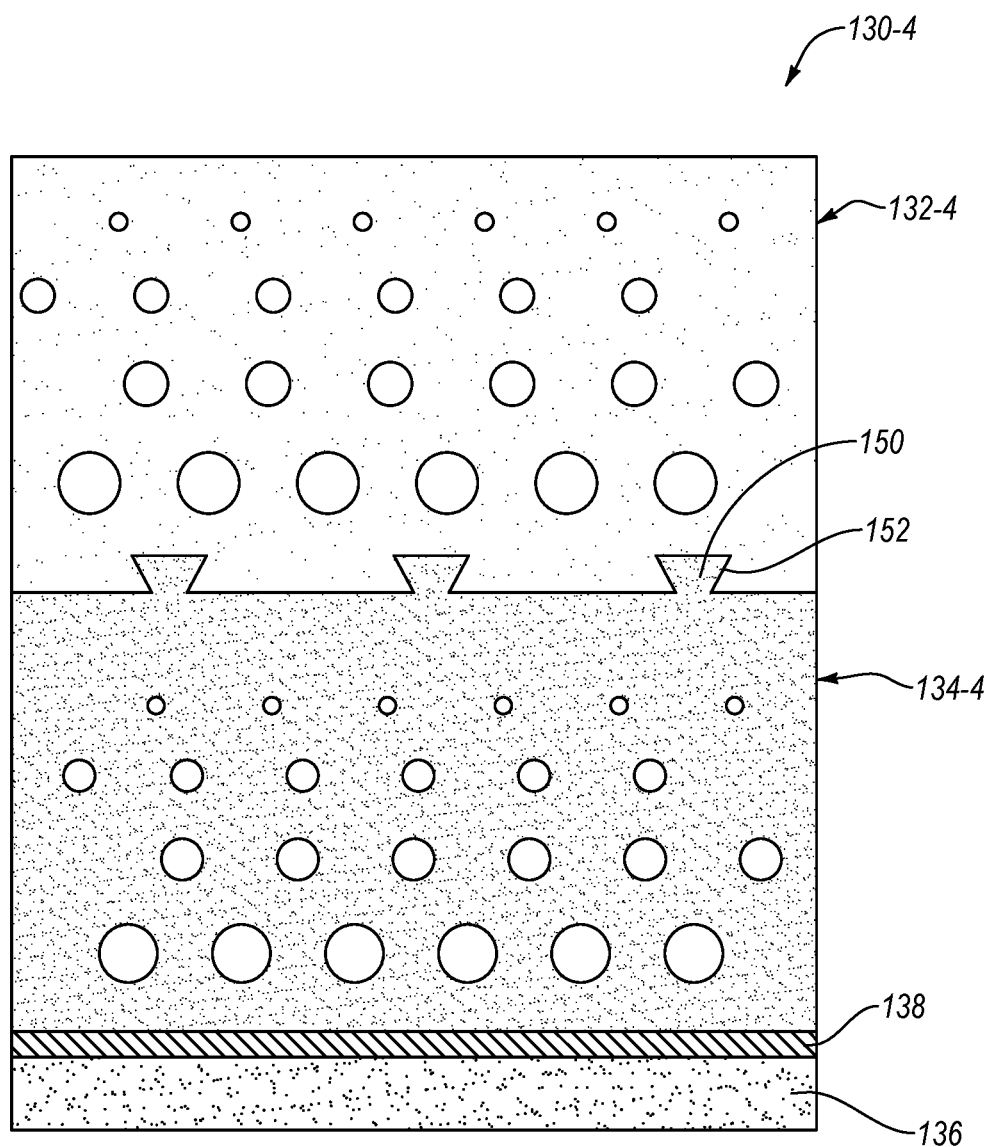
FIG. 6 is a cross-sectional view of a multi-layered ballistic part, according to one or more examples of the present disclosure.

Referring to FIG. 6, in various embodiments, a reverse of the mechanical interconnection features 144, 146 of FIG. 2 is shown. A metal layer 134-2 includes protruding mechanical interconnection features 150 that include a cross-section that expands as the mechanical interconnection features 150 extend away from the ballistics-proximal surface 156 of the metal layer 134-2. A ceramic layer 132-2 includes a mechanical interconnection features 152 that surrounds the mechanical interconnection features 150 of the metal layer 134-2. In this example, the mechanical interconnection features 152 of the ceramic layer 132-2 pinch in under the protruding mechanical interconnection features 150 of the metal layer 134-2.

The thickness t1 of the ceramic layer 132, the thickness t2 of the metal layer 134, and thickness t3 of the polymer layer 136 are chosen based on predefined criterion, such as desired ballistic resistance capabilities, weight, and spatial constraints. The thickness t1 may be equal to, greater than, or less than the thickness t2. The thickness t1 may alternate between being equal to, greater than, or less than the thickness t2.

Because the mechanical interconnection features interlock with each other or have overhang portions, and because slidably interconnecting the features is not feasible due to the shape of the armor, conventional manufacturing techniques (casting, machining, extruding, etc.) are unable to form the features, let alone enable interconnecting of the features. However, in the present disclosure, the ceramic layer 132 and the metal layer 134 are additively manufactured, whereby one of the ceramic layer 132 and the metal layer 134 is created before the other one of the ceramic layer 132 and the metal layer 134. Accordingly, the mechanical interconnection features can be formed with overhang portions and interconnected as the ceramic layer and the metal layer are being formed, via an additive manufacturing process, layer-by-layer. For example, the metal layer 134 is first created in a layer-by-layer process (i.e., additive manufacturing, which adds sub-layer onto sub-layer to form the metal layer 134). Example additive manufacturing of metal, such as powder-based ceramic 3D printing technologies include but are not limited to three-dimensional printing (3DP), selective laser sintering (SLS) (i.e., direct metal laser sintering (DMLS) or laser metal fusion (LMF)), selective laser melting (SLM), electron beam melting (EBM), laser deposition welding (LMD). Additive manufacturing of metal is well known in the art and no further explanation is necessary for a person of skill in the art to understand the disclosed subject matter. The metal layer 134 is made of any of various high-strength or high-carbon steels, such as, but not limited to high-hardness armor steel and/or homogenous armor steel, specialty alloys, titanium, aluminum, or comparable materials. According to some implementations, the metallic material of metal layer 134 is a powder or powdered metallic material (e.g., high-carbon steel powder, such as 0.80% carbon steel) that is applied according to the processes described above.

The ceramic layer 132 is additively manufactured onto the metal layer 134 (e.g., sub-layer by sub-layer until the ceramic layer 132 is formed). A flowable ceramic material, such as a ceramic slurry, is deposited within the mechanical interconnection features 146, then cured or hardened to create a plurality of the second mechanical interconnection features 144. After the second mechanical interconnection features 144 are formed, the rest of the ceramic layer 132 is applied, layer-by-layer, on top of the metal layer 134 and on top of the second mechanical interconnection features 144. Example ceramic additive manufacturing processes include binder jetting, powder sintering, nanoparticle jetting, photopolymerization (DLP). Ceramic additive manufacturing processes are well known in the art and not further explanation is necessary for a person of skill in the art to understand the disclosed subject matter.

Referring to FIGS. 1 thru 9, in various embodiments, a polymer layer 136 may be bonded to a base surface of the metal layer 134, 134-1, 134-2. The polymer layer 136 may be attached to the metal layer 134, 134-1, 134-2 with an adhesive layer 138 or by thermal curing. The polymer layer 136 exhibits high tensile strength, high temperature resistance for providing additional ballistics protection. In various embodiments, the ceramic layer 132 and/or the metal layer 134 are additively manufactured to have varying porosity. As used herein, the porosity of a material is dependent on the number and characteristics of pores 140 formed in the layers. Accordingly, varying the porosity of a material of one or both of the ceramic layer 132 and the metal layer 134 means the density of the layers, and the characteristics of the pores 140, of the one or both of the ceramic layer 132 and the metal layer 134, vary as well. The porosity may vary vertically, horizontally, or a combination of horizontally and vertically (e.g., diagonally). Factors that dictate the variation of the porosity include one or more of the quantity of the pores 140, shapes of the pores 140, sizes of the pores 140, and spacing of the pores 140. The selection of the characteristics of the pores 140 that vary and how those characteristics vary, to vary the density of the one or both of the ceramic layer 132 and the metal layer 134, is based on predefined criterion, such as desired ballistic resistance capabilities, weight, and spatial constraints. The predefined criterion may be a comparison of criteria, such as a ballistics resistance versus weight value, or may be a pattern configured to minimize crack propagation, to direct crack propagation, or to direct a force of a projectile. The porosity/density may be selected to fully absorb the force of a ballistic projectile or the porosity/density may be selected to deflect a ballistic projectile by deflecting the force of the ballistic projectile.

Referring again to FIG. 2, the ceramic layer 132 includes a ballistics-proximal surface 148 and a ballistics-distal surface 154, and the metal layer 134 includes the ballistics-proximal surface 156 and a ballistics-distal surface 158. The ceramic layer 132 and the metal layer 134 are configured to be a less porous and stronger (i.e., more dense) proximate the ballistics-proximal surfaces 148, 156 than proximate the ballistics-distal surfaces 154, 158. In some examples, the density of the ceramic layer 132 and the metal layer 134 changes across the thicknesses t1 and t2, respectively, without reducing resistance to ballistic impacts below threshold amounts. In certain examples, the pores 140 have any of various shapes and spacing that help to maximize a ratio between ballistic resistance and weight. The pores 140 can be designed to whatever shape and have relative spacing that is most structurally and/or ballistically efficient. More specifically, in some examples, the pores 140 are spaced and shaped to optimize weight and absorb or redirect a ballistic projectile in a desired manner. Functionally this means that a direct shot would intentionally be turned into a tumbled shot, which can be easier to stop/retain. Depending on the space needed to turn the shot, the pores can be tailored to achieve those needs. In various embodiments, a desired porosity is attained by forming the pores 140 to have one or more of a variety of shapes, such as spherical, oval, pyramidal, trapezoidal, or any desired shape. In the same or other embodiments, the porosity is varied by controlling spacing between the pores 140 and/or the sizes of the pores 140.

Still referring to FIG. 2, in one example, the pores 140 of the ceramic layer 132 are spherical. Moreover, the pores 140 of the ceramic layer 132 are arranged in multiple rows of pores, with the spacing and size of the pores 140 of a given row being uniform. In the example of FIG. 2, the ceramic layer 132 includes pores arranged into a first row 140A, a second row 140B, a third row 140C, and a fourth row 140D with the pores 140 being a first size at a first row 140A closest to the ballistic-proximal surface 148, a second row 140B of the pores 140 having a second size, a third row 140C of the pores 140 having a third size, and a fourth row 140D of the pores 140 having a fourth size. The first size is smaller than the second size. The second size is smaller than the third size. The third size is smaller than the fourth size. In this example, the pores 140 in adjacent layers are offset from each other.

The metal layer 134 include pores 142 that are spherical with the pores 142 being a first size at a first row 142A closest to the ballistic-proximal surface 156, a second row 142B of the pores 142 having a second size, a third row 142C of the pores 142 having a third size, and a fourth row 142D of the pores 142 having a fourth size. The first size is smaller than the second size. The second size is smaller than the third size. The third size is smaller than the fourth size. In this example, the pores 142 in adjacent layers are offset from each other.

Figure 3:
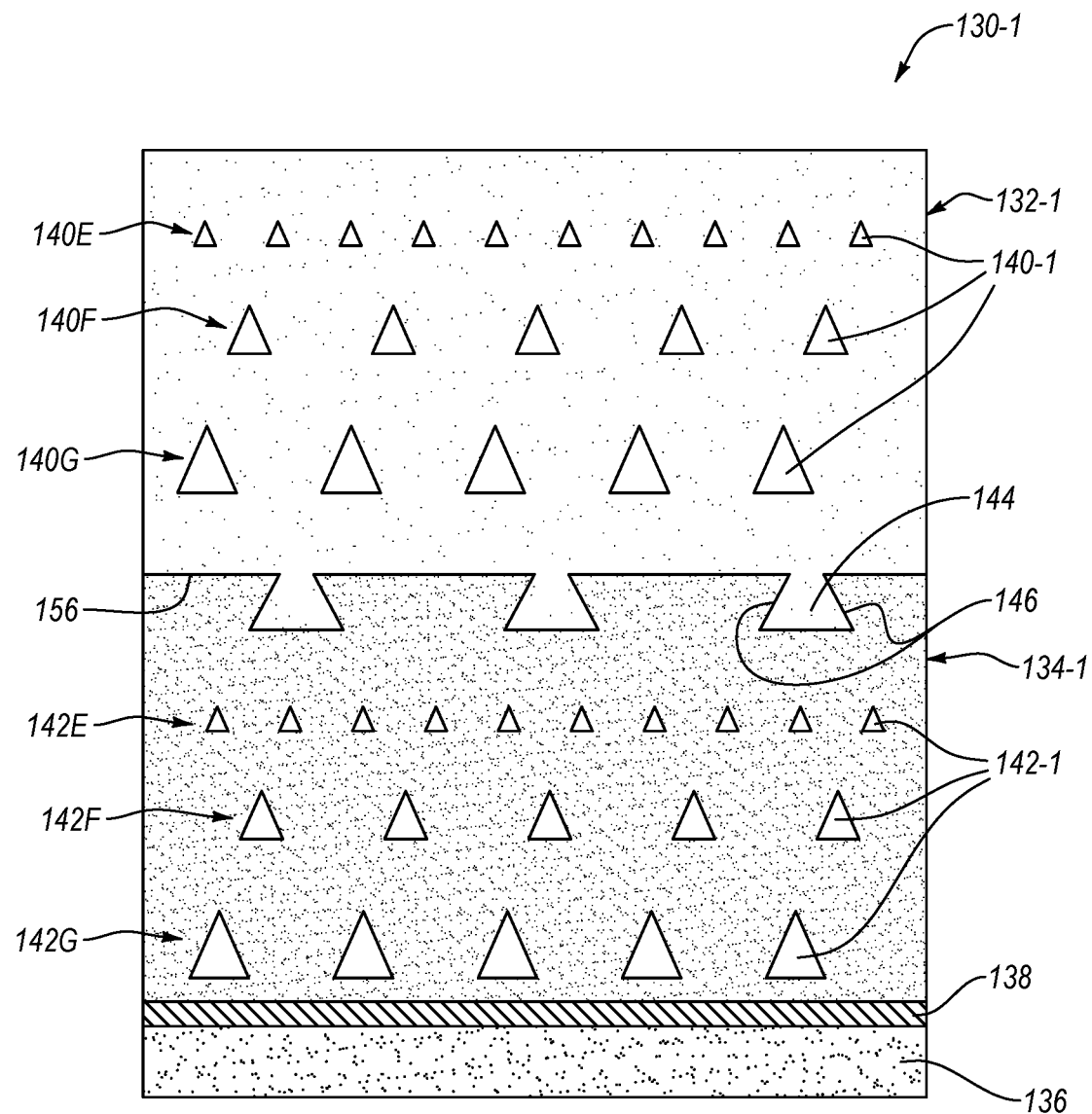
FIG. 3 is a cross-sectional view of a multi-layered ballistic part, according to one or more examples of the present disclosure.

Referring to FIG. 3, in one example, pores 140-1 of a ceramic layer 132-1 of a ballistic armor 130-1 are triangular. Moreover, the pores 140-1 of the ceramic layer 132-1 are arranged in multiple rows of pores, with the spacing and size of the pores 140-1 of a given row being uniform. In the example of FIG. 3, the ceramic layer 132-1 includes pores arranged into a first row 140E, a second row 140F, and a third row 140G with the pores 140-1 being a first size at a first row 140E closest to the ballistic-proximal surface 148, a second row 140F of the pores 140-1 having a second size, and a third row 140G of the pores 140 having a third size. The first size is smaller than the second size. The second size is smaller than the third size. In this example, the pores 140-1 in adjacent rows are offset from each other.

Still referring to FIG. 3, a metal layer 134-1 of the ballistic armor 130-1 includes pores 142-1 that are triangular. The pores 142-1 are a first size at a first row 142E closest to the ballistic-proximal surface 156, a second row 142F of the pores 142-1 having a second size, and a third row 142G of the pores 142-1 having a third size. The first size is smaller than the second size. The second size is smaller than the third size. In this example, the pores 142 in adjacent rows are offset from each other.

Figure 4:
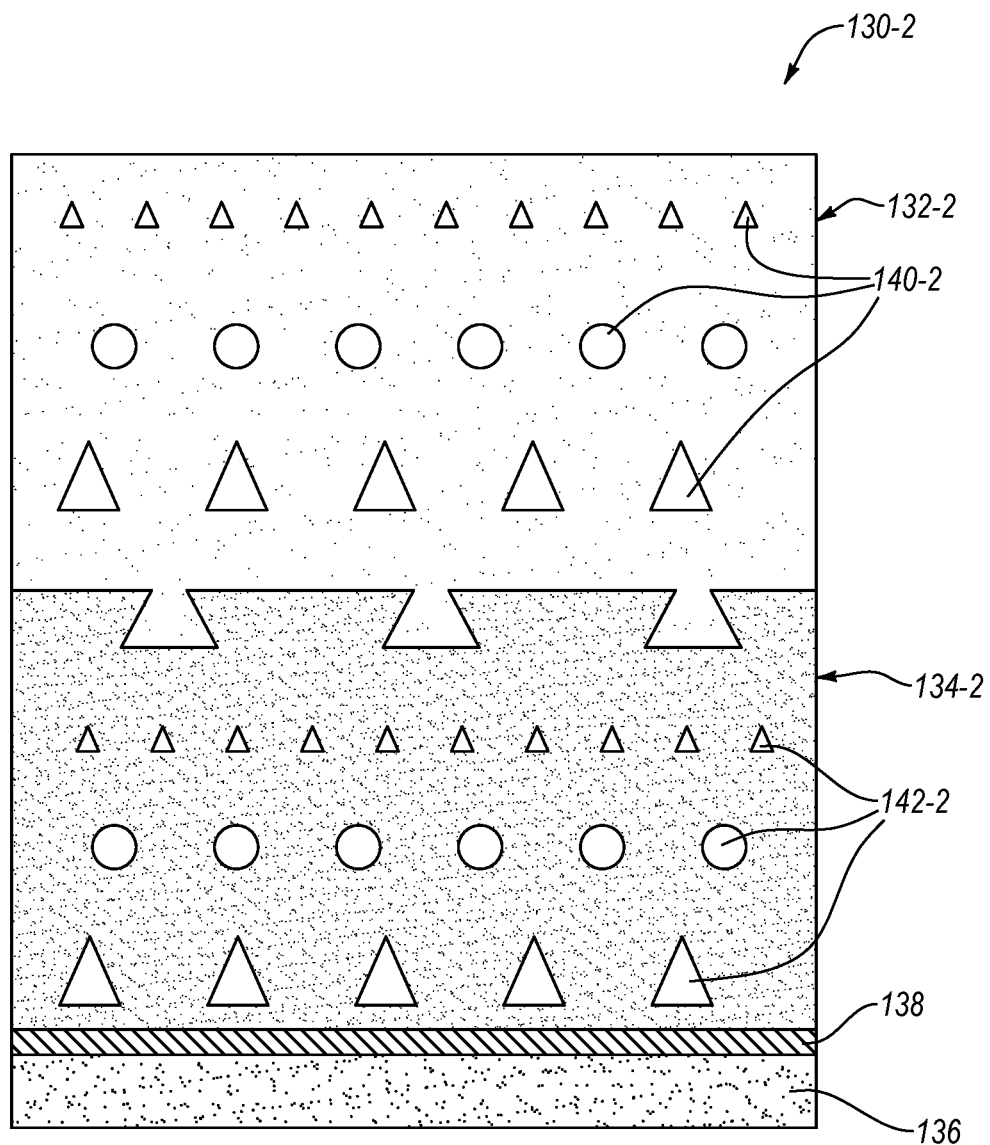
FIG. 4 is a cross-sectional view of a multi-layered ballistic part, according to one or more examples of the present disclosure.

Referring to FIG. 4, in one example, pores 140-2 of a ceramic layer 132-2 of a ballistic armor 130-2 are spherical. Moreover, the pores 140-2 of the ceramic layer 132-2 are arranged in multiple rows of pores, similar to the pores 140 of the ceramic layer 132 of FIG. 2. A metal layer 134-2 of the ballistic armor 130-2 includes pores 142-2 that are triangular and are arranged in multiple rows of pores, similar to the pores 142-1 of the metal layer 134-1 of FIG. 3.

Figure 5:
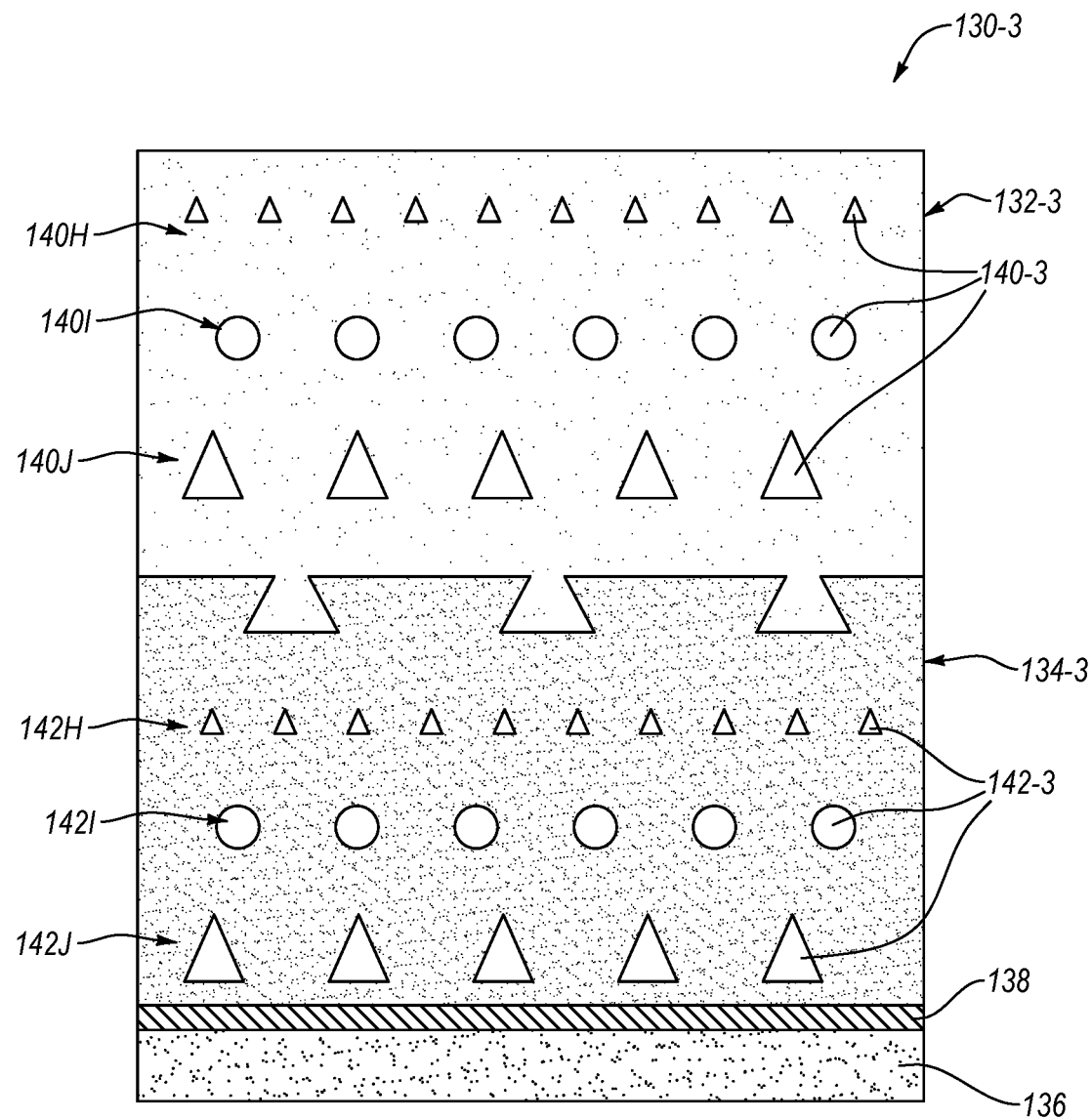
FIG. 5 is a cross-sectional view of a multi-layered ballistic part, according to one or more examples of the present disclosure.

Referring to FIG. 5, in one example, pores 140-3 of a ceramic layer 132-3 of a ballistic armor 130-3 are triangular in a first row 140H and a third row 140J and are spherical in a second row 140I interposed between the first row 140H and the third row 140J. A metal layer 134-3 of the ballistic armor 130-3 includes pores 142-3 that are triangular in a first row 142H and a third row 142J and are spherical in a second row 142I interposed between the first row 142H and the third row 142J. Moreover, the spacing and size of the pores 140-3, 142-3 of a given row are uniform.

Although not shown, the spacing, size, and/or shape of the pores of a given row may be non-uniform based on pre-defined or desired ballistics characteristics.

Figures 1, 7:
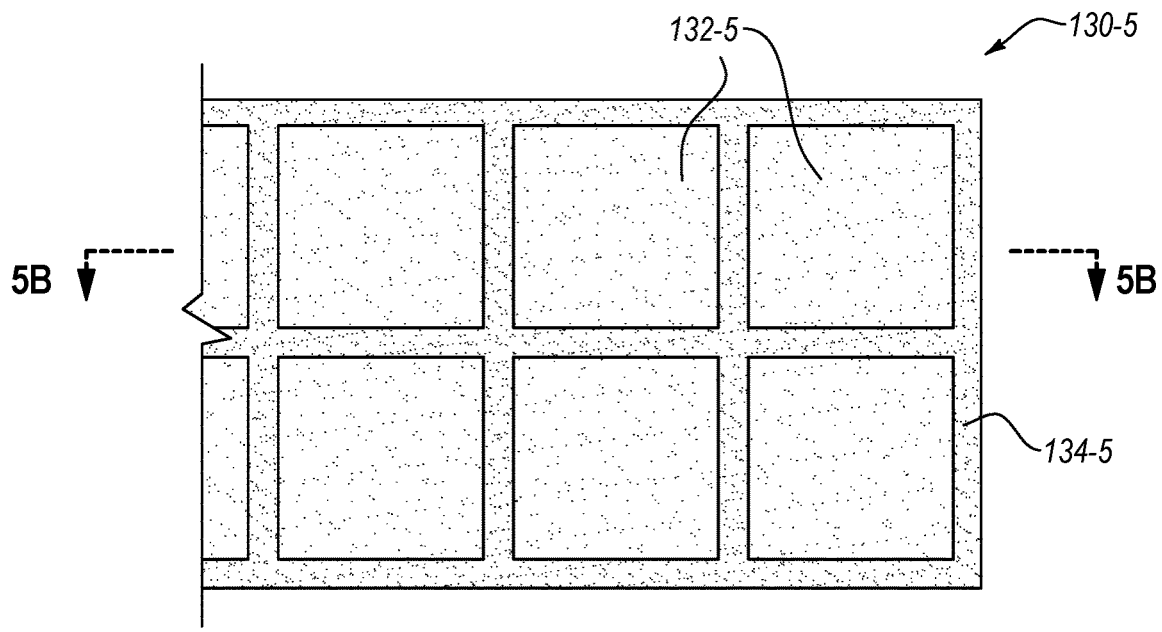
Figures 2, 7:
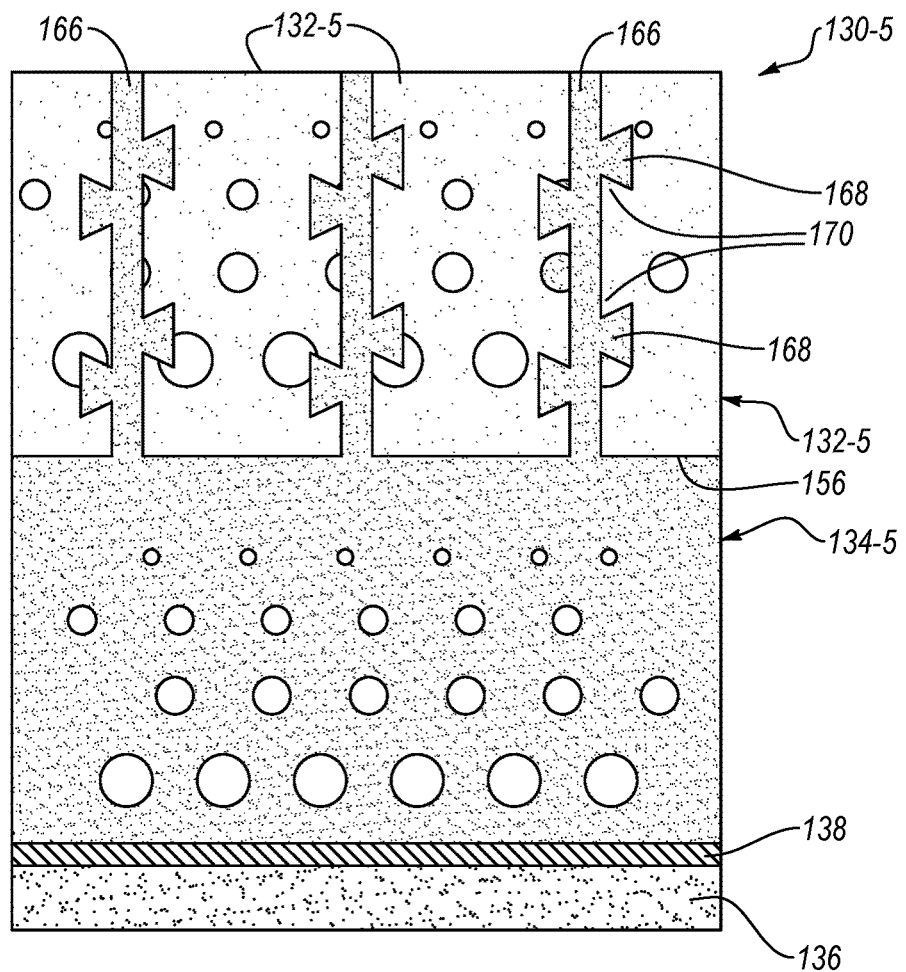

Referring to FIGS. 7-1 and 7-2, in various embodiments, a ballistic armor part 130-5 is formed with a single metal layer 134-5 and a plurality of ceramic panels 132-5. The metal layer 134-5 is additively manufactured to include a plurality of metal posts 166 (e.g., supports) that extend away from the ballistics-proximal surface 156 of the metal layer 134-5. In various embodiments, mechanical interconnection features 168, similar to those shown in FIGS. 2 thru 4, are included on the metal posts 166. As the ceramic panels 132-5 are additively manufactured onto the metal layer 134-5, mechanical interconnection features 170 of the ceramic panels 132-5 are formed around the mechanical interconnection features 168 on the metal posts 166. The ceramic panels 132-5 may have a variety of different shapes, such as rectangular as shown, circular, polygonal, or any desired shape. The metal posts 166 between the ceramic panels 132-5 aid in resisting cracks from propagating between adjacent ceramic panels 132-5.

Figure 8:
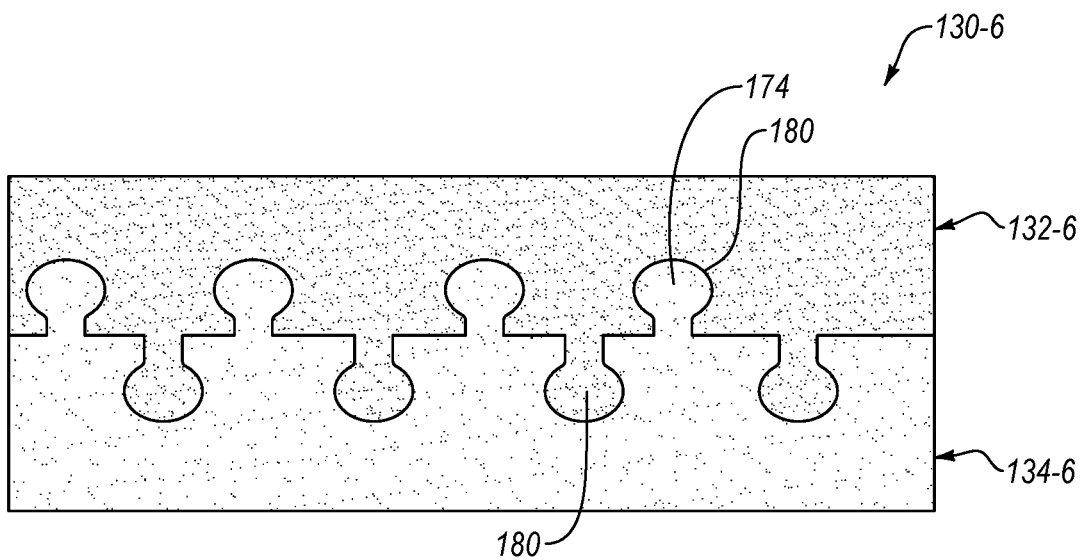
FIG. 8 is a cross-sectional view of mechanical interconnecting components within a multi-layered ballistic part, according to one or more examples of the present disclosure.

Referring to FIGS. 8, in various embodiments, a ballistic armor part 130-6 includes a metal layer 134-6 having mechanical interconnection features 174 that mechanically interconnect with mechanical interconnection features 180 of a ceramic layer 132-6. In the illustrated example, the mechanical interconnection features 174, 180 include cavities or troughs adjacent to bulb-like extensions. The cavities are connected to their corresponding layer 132-6, 134-6 via neck portions. The neck portions have a dimension perpendicular to a thickness of the ballistic armor part 130-6 that is less than the diameter value of the cavities of the mechanical interconnection features 174, 180.

Figure 9:
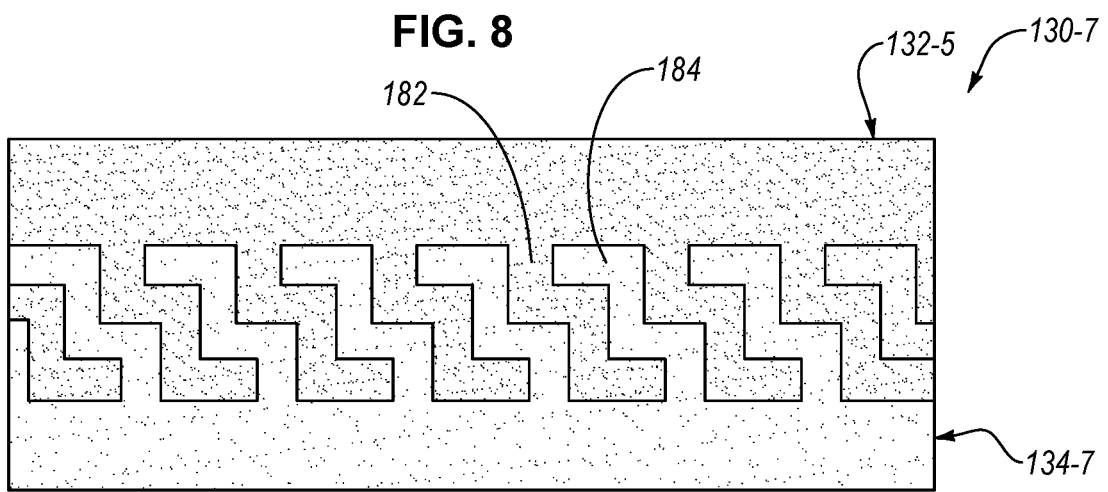
FIG. 9 is a cross-sectional view of mechanical interconnecting components within a multi-layered ballistic part, according to one or more examples of the present disclosure.

Referring to FIG. 9, in various embodiments, a ballistic armor part 130-7 includes a metal layer 134-7 having mechanical interconnection features 184 that mechanically interconnect with mechanical interconnection features 182 of a ceramic layer 132-7. The mechanical interconnection features 184 include stairstep sections separated by corresponding stairstep voids. The mechanical interconnection features 182 of the ceramic layer 132-7 is additively formed within the stairstep voids between the stairstep sections of the mechanical interconnection features 184.

Figures 1, 10:
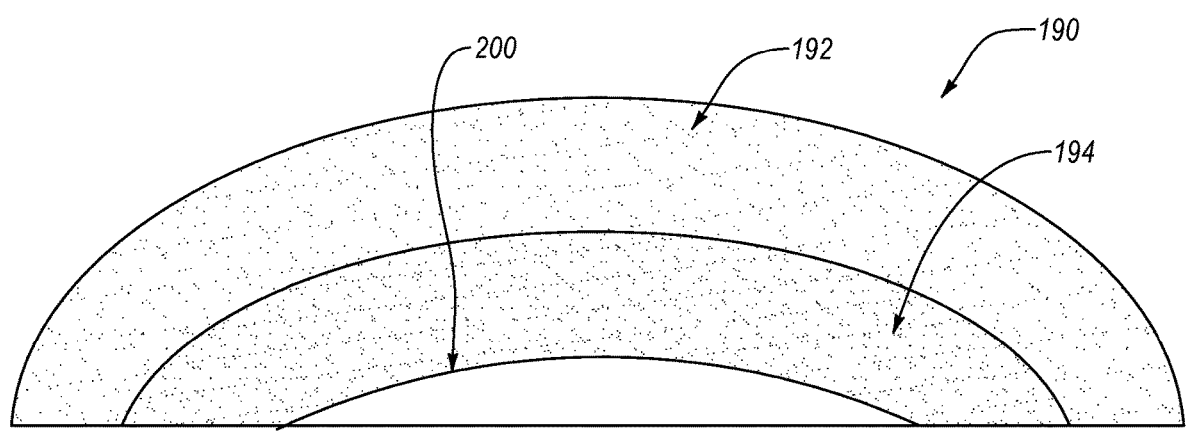
Figures 2, 10:
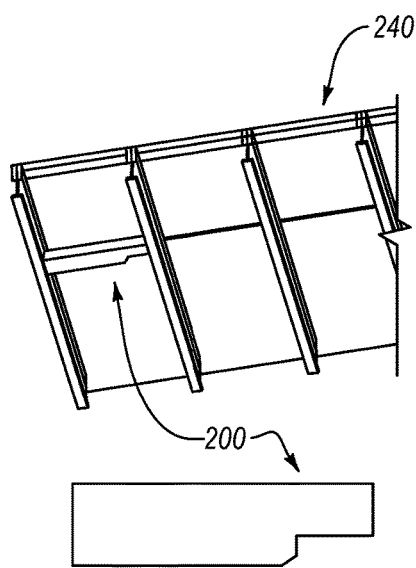
Figures 3, 10:
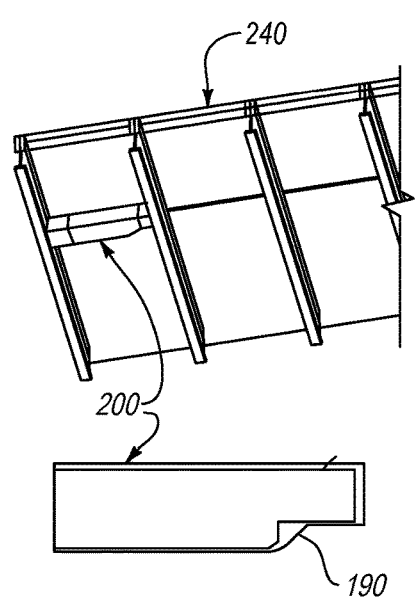
Figures 4, 10:
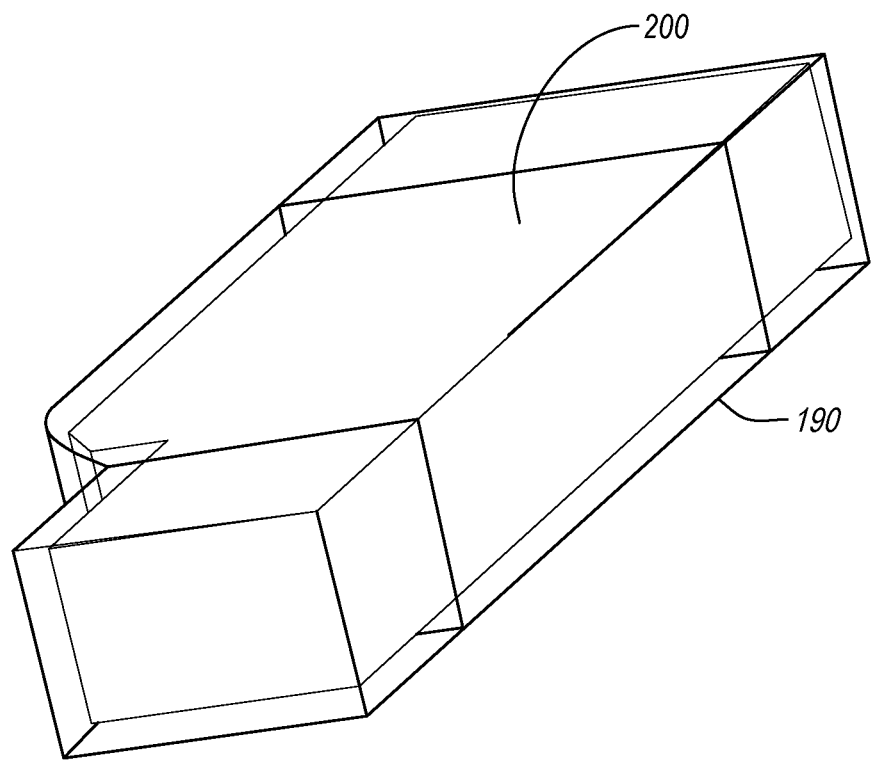
Figures 5, 10:
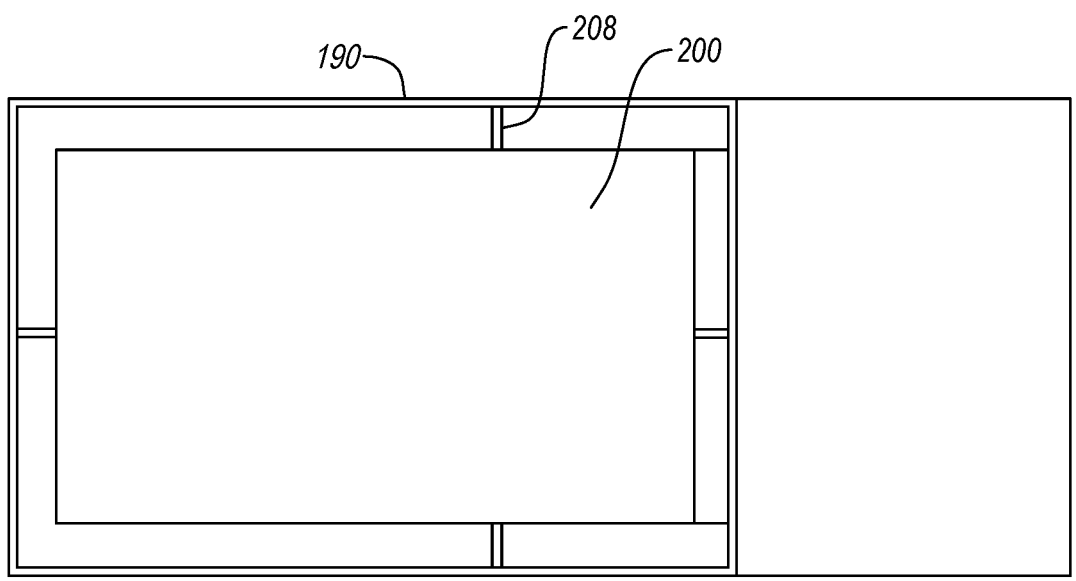
Figures 6, 10:
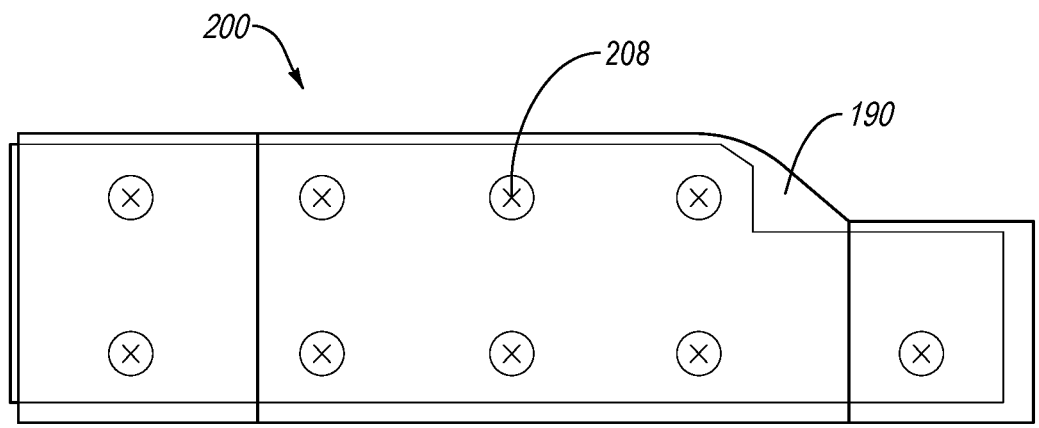

Referring to FIGS. 10-1 through 10-6, in various embodiments, a ballistic armor 190 having an outer ceramic layer 192 and an inner metal layer 194 is formed to conform to a part 200 where ballistic protection is desired. The part 200 may be attached to a component 240 of a larger device, such as a vehicle, or may be a standalone device. The ballistic armor 190 is additively manufactured to conform to the part 200. The part 200 and thus the conformed ballistic armor 190 may have configurations with curved, rounded, or non-flat surfaces, two surfaces connected at any angle, or a combination thereof. The ballistic armor 190 may rest on the part 200 or may be adhered to or fastened to the part 200. As shown in FIGS. 10-5 and 10-6, the ballistic armor 190 may be attached to the part 200 with fasteners 208, such as, without limitation, bolts, rivets, screws, adhesives, or comparable materials.

Figures 1, 11:
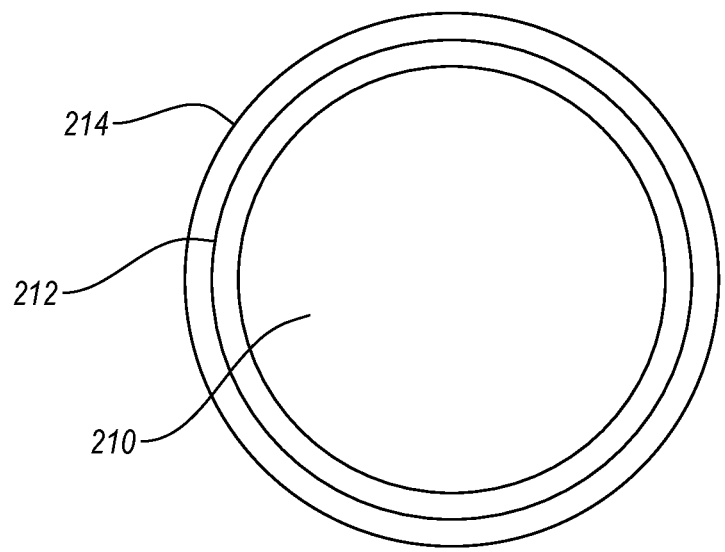
Figures 2, 11:
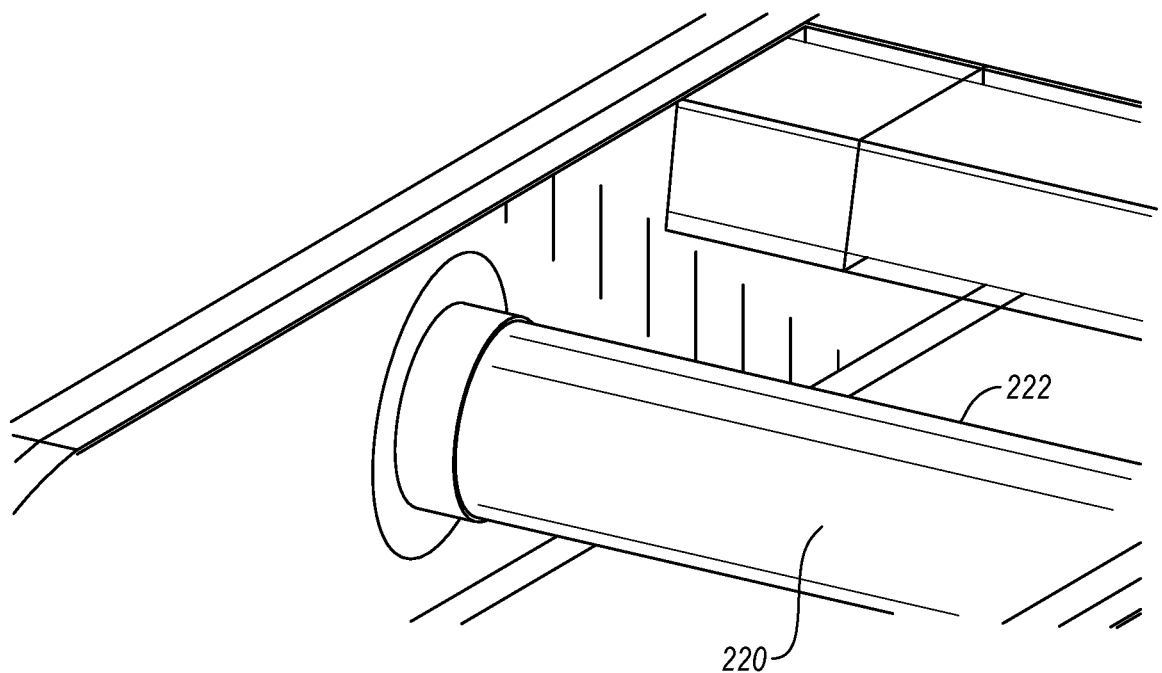
Figures 3, 11:
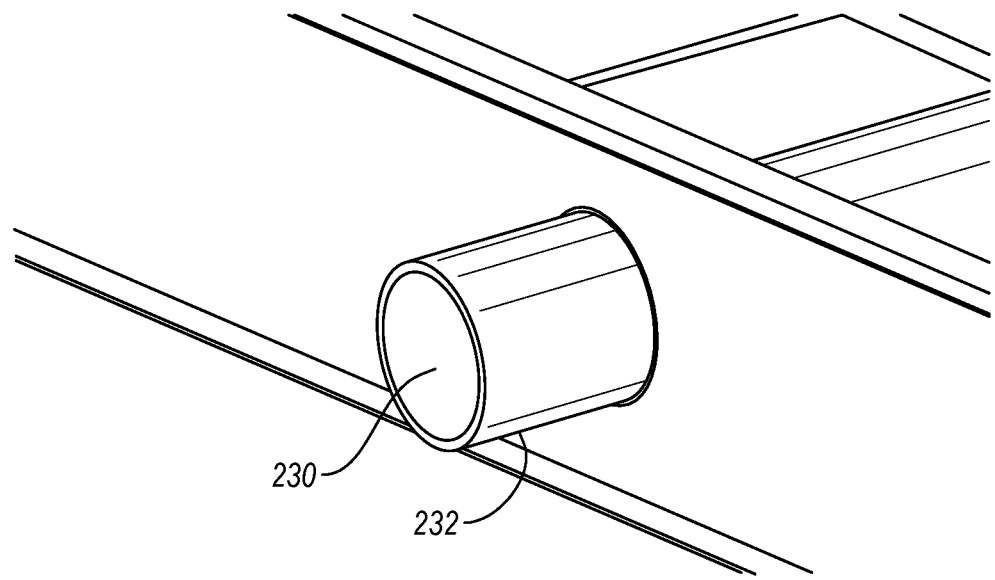

Referring to FIGS. 11-1 through 11-3, in various embodiments, a ballistic armor 214 is formed to surround a part 210, for which ballistics protection is desired. The part 210 and the ballistic armor 214 are cylindrical in shape. In one embodiment, the part 210 is surrounded by an adhesion layer 212 with the ballistic part 214 attached to the adhesion layer 212. Referring to FIGS. 11-2 and 11-3, the part 210 with the conformed ballistic part 214 is an internal component attached between support structures within a vehicle or other device. The part 210 can be any of various types of components, such as, without limitation, wiring, tubing, fuel lines, electronic or electrical components, or comparable components.

Figure 12:
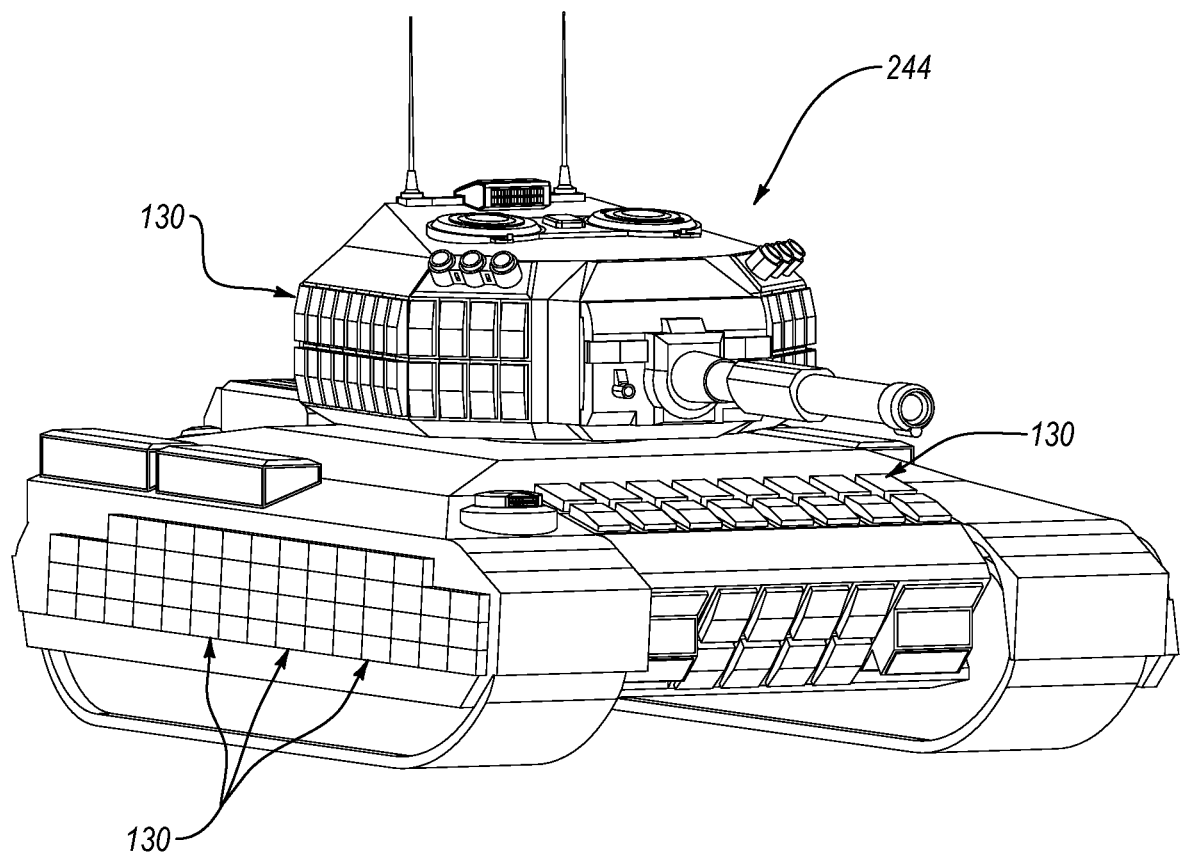
FIG. 12 is a perspective view of a vehicle protected by conformal multi-layered ballistic armor, according to one or more examples of the present disclosure.

Referring to FIG. 12, in various embodiments, the ballistic armor 130 is attached to a tank 244. More specifically, a plurality of ballistic armor plates are attached to various external surfaces of the tank 244 for providing ballistics protection. The ballistic armor 130 may also be located around internal parts of the tank 244. It will be appreciated that the vehicle can be any type of vehicle whatsoever as desired without limitation. For example and given by way of non-limiting examples, in various embodiments the vehicle may include a motor vehicle driven by wheels and/or tracks, such as, without limitation, an automobile, a truck, a sport utility vehicle (SUV), a van. The vehicle may also be a wheel towable vehicle, such as, without limitation, a trailer, a camper, or the like. Given by way of further non-limiting examples, in various embodiments the vehicle may include a marine vessel such as, without limitation, a boat, a ship, a submarine, a submersible, an autonomous underwater vehicle (AUV), and the like. Given by way of further non-limiting examples, in various embodiments the vehicle may include an aircraft such as, without limitation, a fixed wing aircraft, a rotary wing aircraft, and a lighter-than-air (LTA) craft.

Figure 13:
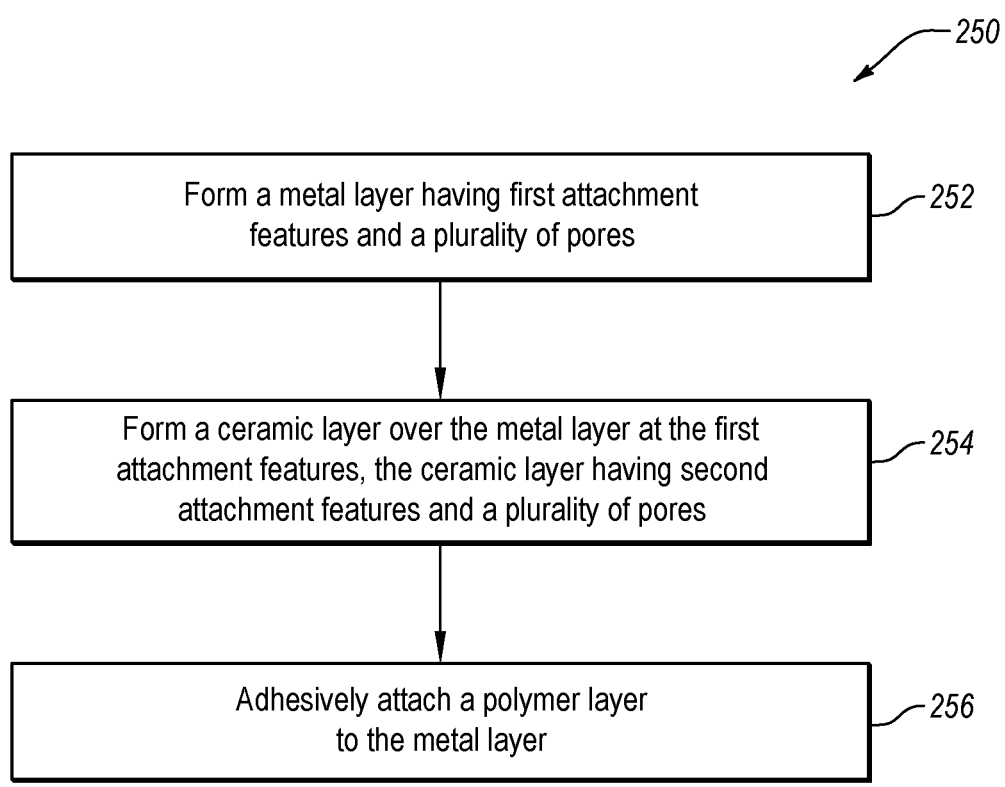
FIG. 13 is a schematic flow diagram of a method of forming conformal multi-layered metal armor, according to one or more examples of the present disclosure.

Referring to a method 250 of FIG. 13, a multi-layered metallic assembly is formed by executing block 252 to block 256 of the method 250. Block 252 includes forming a metal layer having first interconnection features and a variety of pores. The metal layer is made of a metallic material using additive manufacturing processes. Block 254 of the method 250 includes forming a ceramic layer over the metal layer having second interconnection features that mechanically interconnect/interlock with the first interconnection features. The ceramic layer is made of ceramic materials using additive manufacturing processes. Block 256 includes attaching a polymer layer to a base side of the metal layer.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The schematic flow chart diagrams included herein are generally set forth as logical flow chart diagrams. As such, the depicted order and labeled steps are indicative of one example of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present subject matter may be embodied in other specific forms without departing from its spirit or essential characteristics. The described examples are to be considered in all respects only as illustrative and not restrictive. All changes which come within the meaning and range of equivalency of the claims are to be embraced within their scope.

What is claimed is:

1. A ballistic armor comprising:
a metal layer, comprising:
first mechanical interconnection features; and
a plurality of first pores; and
a ceramic layer, comprising:
second mechanical interconnection features, configured to mechanically interconnect with the first mechanical interconnection features; and
a plurality of second pores;
wherein:
the plurality of first pores is configured such that a density of the metal layer varies across a thickness of the metal layer; and
the plurality of second pores is configured such that a density of the ceramic layer varies across a thickness of the ceramic layer.

2. The ballistic armor of claim 1, wherein:
at least some of the plurality of first pores have a different size than others of the plurality of first pores such that the density of the metal layer changes across the thickness of the metal layer without reducing resistance to ballistic impact below a first threshold amount; and
at least some of the plurality of second pores have a different size than others of the plurality of second pores such that the density of the ceramic layer changes across the thickness of the ceramic layer without reducing resistance to ballistic impact below a second threshold amount.

3. The ballistic armor of claim 2, wherein:
the density of the metal layer increases across the thickness of the metal layer in a direction toward the ceramic layer; and
the density of the ceramic layer decreases across the thickness of the ceramic layer in a direction toward the metal layer.

4. The ballistic armor of claim 1, wherein the density of at least one of the metal layer or the ceramic layer varies in a previously defined direction configured to cause deflection of a force of a ballistic projectile.

5. The ballistic armor of claim 1, wherein the plurality of first pores and the plurality of second pores has at least one of a quantity, sizes, shapes, and distribution patterns chosen according to a predefined criterion.

6. The ballistic armor of claim 5, wherein the predefined criterion is based on one of:
a value of ballistics resistance versus weight; or
a pattern configured to minimize crack propagation through at least one of the metal layer and the ceramic layer.

7. The ballistic armor of claim 1, wherein:
the ceramic layer further comprises a plurality of ceramic panels;
the metal layer further comprises metal posts interposed between adjacent ceramic panels; and
the first mechanical interconnection features are located on the metal posts.

8. The ballistic armor of claim 1, further comprising a polymer layer bonded to the metal layer.

9. The ballistic armor of claim 1, wherein the metal layer and the ceramic layer are shaped to conform to a part of a device, wherein the part of the device has a rounded or non-flat surface, two surfaces connected at an angle, or a combination thereof.

10. The ballistic armor of claim 1, wherein each one of the first mechanical interconnection features and the second mechanical interconnection features comprises an overhang portion.

11. A vehicle comprising:
a component; and
ballistic armor configured to ballistically protect the component, the ballistic armor comprising:
a metal layer, comprising:
first mechanical interconnection features; and
a plurality of first pores; and
a ceramic layer, comprising:
second mechanical interconnection features, configured to mechanically interconnect with the first mechanical interconnection features; and
a plurality of second pores;
wherein:
the plurality of first pores is configured such that a density of the metal layer varies across a thickness of the metal layer; and
the plurality of second pores is configured such that a density of the ceramic layer varies across a thickness of the ceramic layer.

12. The vehicle of claim 11, wherein the plurality of first pores and the plurality of second pores include a quantity, size values, shape values, and distribution pattern chosen according to a value of ballistics resistance versus weight, a pattern defined to minimize crack propagation through one of the metal layer, the ceramic layer, or a combination thereof.

13. The vehicle of claim 12, wherein:
at least some of the plurality of first pores have a different size and distribution pattern than others of the plurality of first pores; and
at least some of the plurality of second pores have a different size and distribution pattern than others of the plurality of second pores.

14. The vehicle of claim 12, wherein the density of at least one of the metal layer or the ceramic layer varies in a previously defined direction configured to cause for deflection of a force applied thereto.

15. A method of forming ballistic armor, the method comprising:
forming a metal layer having first mechanical interconnection features and a plurality of first pores; and
forming a ceramic layer, having a plurality of second pores and second mechanical interconnection features, onto the metal layer such that the second mechanical interconnection features interlock with the first mechanical interconnection features;
wherein forming the ceramic layer comprises additively manufacturing the ceramic layer onto the metal layer.

16. The method of claim 15, wherein additively manufacturing comprises:
forming a first sub-layer of the ceramic layer onto the metal layer; and
forming a second sub-layer of the ceramic layer onto the first sub-layer of the ceramic layer.

17. The method of claim 15, wherein:
forming the ceramic layer further comprises forming at least some of the plurality of second pores to have a different size than others of the plurality of second pores such that a density of the ceramic layer changes across a thickness of the ceramic layer; and
forming the metal layer further comprises forming at least some of the plurality of first pores to have a different size than others of the plurality of first pores such that a density of the metal layer changes across a thickness of the metal layer.

18. The method of claim 15, wherein forming the metal layer comprises:
   forming a plurality of metal supports; and
   forming the first mechanical interconnection features onto the metal supports.

19. The method of claim 18, wherein:
   forming the ceramic layer further comprises forming the ceramic layer into panels each having at least one of the second mechanical interconnection features; and
   the panels are interposed between the metal supports and the first mechanical interconnection features interconnect with the second mechanical interconnection features.

20. The method of claim 15, wherein forming the metal layer and the ceramic layer further comprises forming the metal layer and the ceramic layer to conform to a part of a device, wherein the part of the device has a rounded or non-flat surface, two surfaces connected at an angle, or a combination thereof.

\* \* \* \* \*